May 22, 1956
L. T. SELLSTROM
2,746,267
SELF-REFRIGERATED HIGHWAY TRUCK
Filed Jan. 14, 1955
4 Sheets-Sheet 1
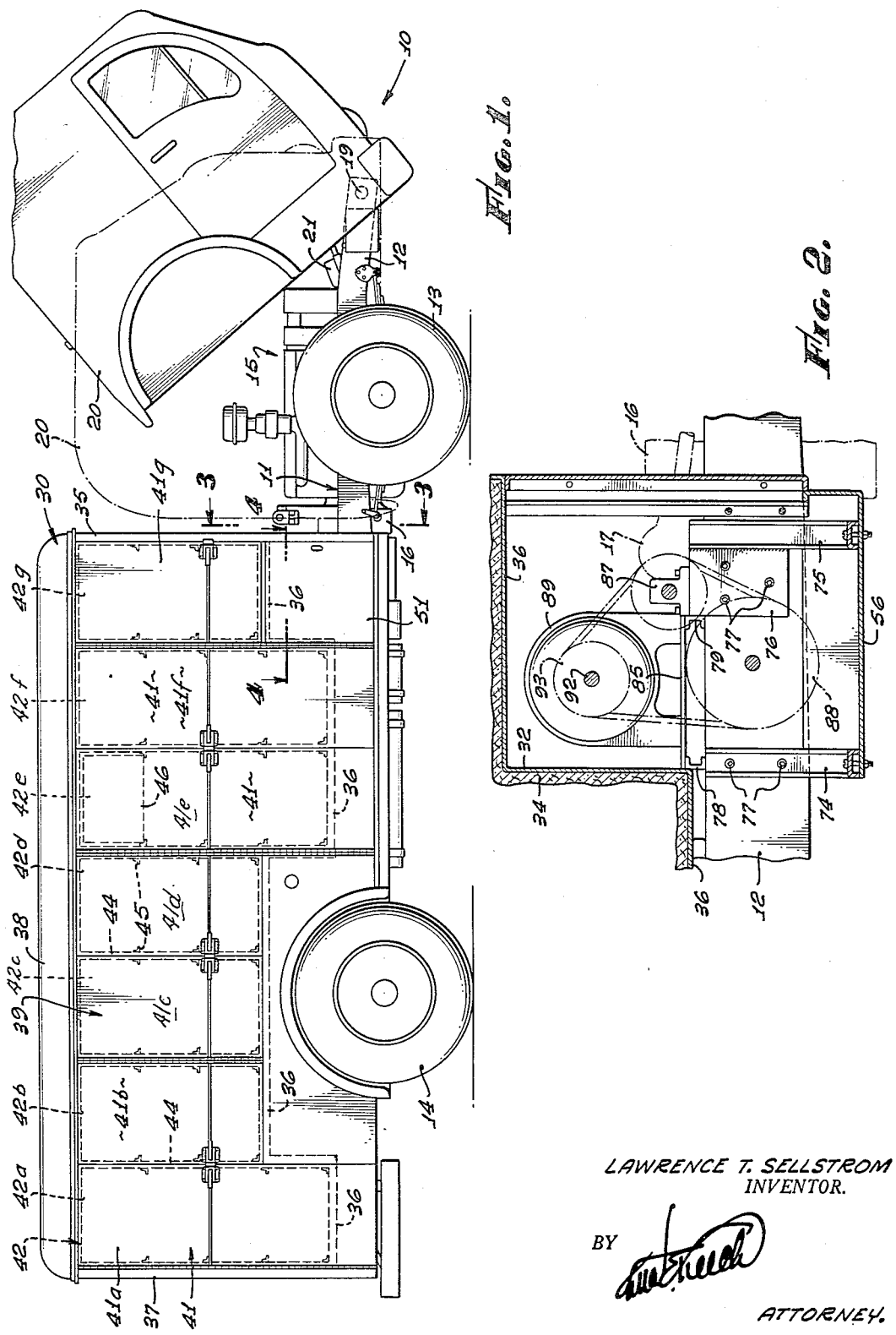
LAWRENCE T. SELLSTROM
INVENTOR.
BY 
ATTORNEY.

May 22, 1956 L. T. SELLSTROM 2,746,267
SELF-REFRIGERATED HIGHWAY TRUCK
Filed Jan. 14, 1955 4 Sheets-Sheet 2

LAWRENCE T. SELLSTROM
INVENTOR.

BY

ATTORNEY.

May 22, 1956 L. T. SELLSTROM 2,746,267
SELF-REFRIGERATED HIGHWAY TRUCK
Filed Jan. 14, 1955 4 Sheets-Sheet 3
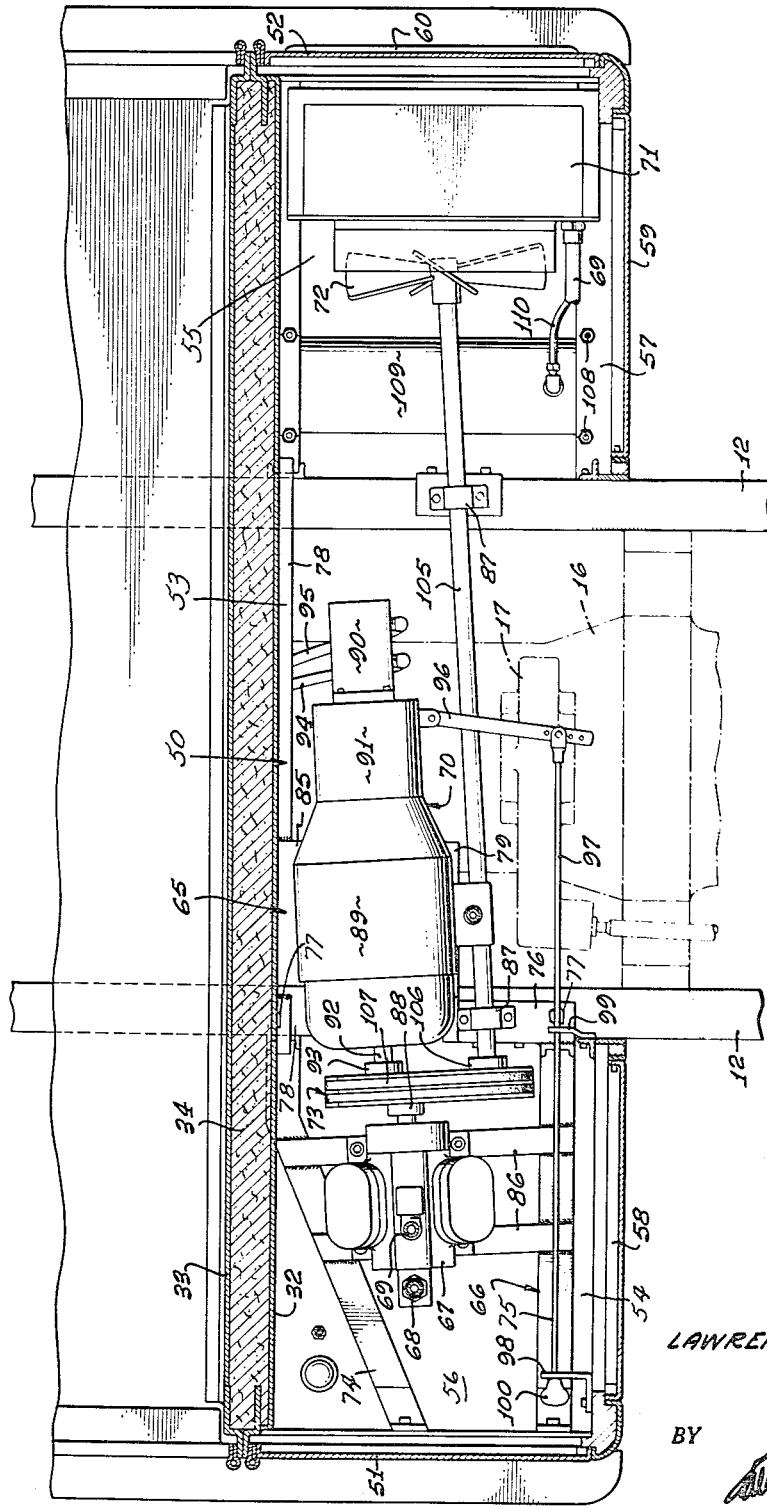
LAWRENCE T. SELLSTROM
INVENTOR.
BY
ATTORNEY.

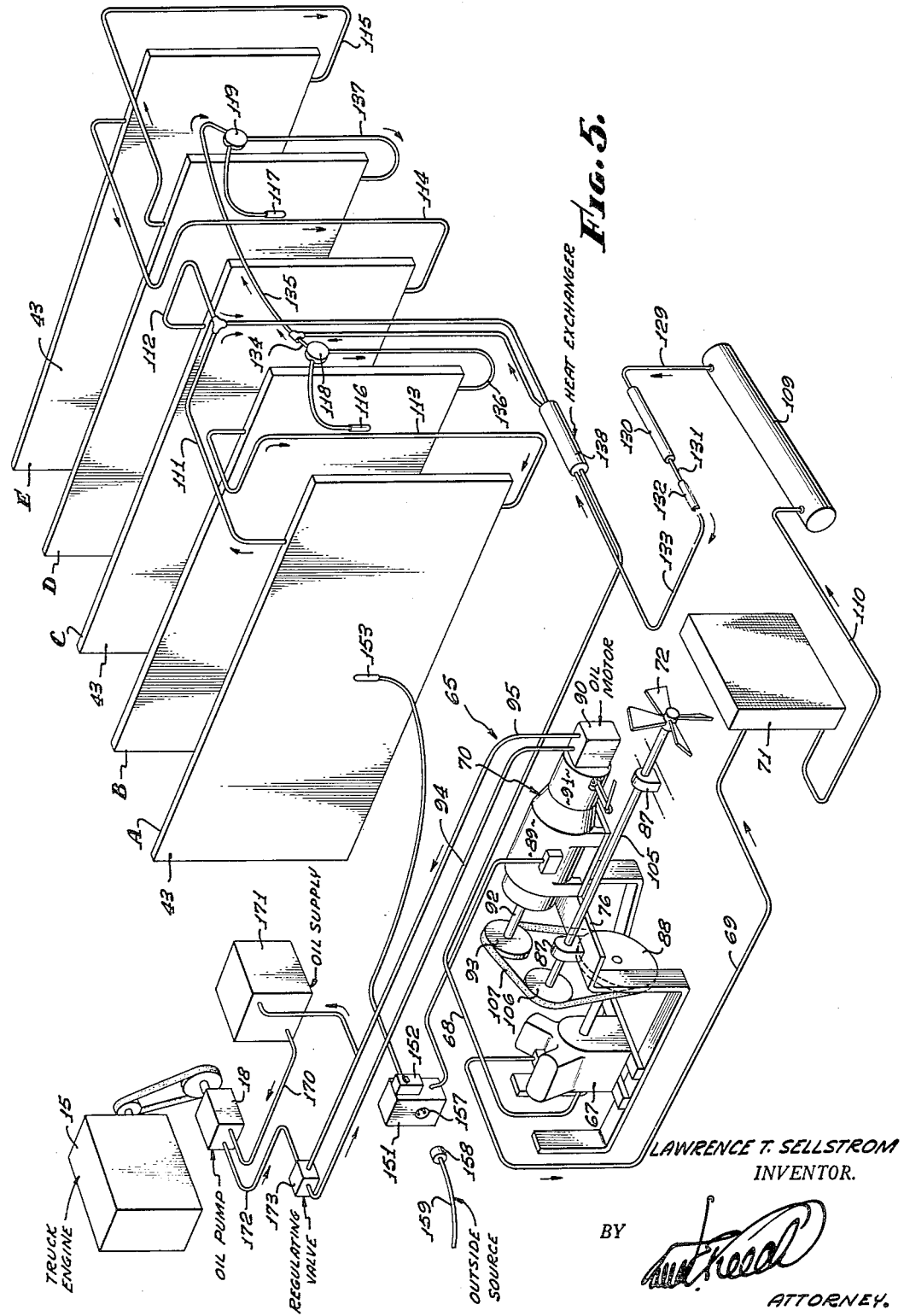

United States Patent Office 2,746,267
Patented May 22, 1956

2,746,267

SELF-REFRIGERATED HIGHWAY TRUCK

Lawrence T. Sellstrom, Los Angeles, Calif., assignor to Knudsen Creamery Co. of California, Los Angeles, Calif., a corporation of California Application January 14, 1955, Serial No. 481,843

3 Claims. (Cl. 62—117.1)

This invention relates to highway transport trucks which have self-contained refrigeration systems.

The problem to the solution of which the present invention is directed is the refrigeration of a particular type of refrigerated truck body to which standard truck refrigerating units are inapplicable. This truck body is internally divided into transverse compartments access to the opposite ends of each of which is had through full height doors hingedly mounted in the side walls of the truck. Each compartment has spaced pairs of angle iron tracks at different levels therein to receive cases of fresh products to be transported by said truck. This type of truck is particularly useful in the wholesale distribution of dairy products.

The body of this truck is necessarily set low on the chassis and does not extend upward beyond a level where cases may be conveniently delivered to and removed from the uppermost tracks by the driver while he stands on the ground. To give the truck body the necessary capacity, a maximum use of the cargo space in the body is required.

One solution of this problem is disclosed in my U. S. Letters Patent, No. 2,667,761. This comprises a self-container refrigeration system mounted in a recess partitioned off from the rest of the body at the rear lower corner of the latter, and includes a power unit driven by a small internal combustion engine.

To overcome the faults inherent in this special engine I have provided a novel refrigerant compressing unit mounted in a similar location as the patent unit, but eliminating the defects of the separate engine for driving the same and having many other advantages thereover. This improvement is covered in my co-pending application, Serial No. 481,842, filed herewith, on January 14, 1955, for U. S. Letters Patent for a Self-Contained Refrigerated Highway Truck.

The inventions above mentioned are specifically applied to a truck in which the driver's cabin has a single fixed position on the chassis. The present invention is directed towards providing an improved refrigeration system for a self-refrigerated highway truck having a body of the type above described and in which the driver's cabin is tiltable forwardly from over the truck engine for giving access to the latter.

It is a particular object of the present invention to provide such a system for such a truck which will be confined within the general rectangular limits of the refrigerated body of the truck but which will divert to its use a relatively small amount of space.

It is a further object of the invention to provide such a refrigerating system in which the refrigerant compressing unit occupies a space in the front lower corner of the truck body.

Still another object of the invention is to provide such a refrigerating system confined within the space within the front lower corner of the truck body which will be optionally operable by the truck engine or by an electric motor which may be energized through a service cord from a standard electric power outlet at the place for storing the truck at night.

The manner of accomplishing the foregoing objects as well as further objects and advantages will be made manifest in the following description taken in connection with the accompanying drawings in which Fig. 1 is a diagrammatic side elevational view of a self-refrigerated truck of the type to which this invention particularly relates and with which a preferred embodiment of the invention is incorporated. This view shows (in full lines) the driver's cab tilted forwardly to expose the truck engine and render the refrigerant compressing unit accessible. The normal driving position of the cabin is shown in broken lines. The cargo case supporting tracks also appear in broken lines.

Fig. 2 is a vertical detailed sectional view taken on the line 2—2 of Fig. 3 and looking in the same direction as the truck is viewed in Fig. 1.

Fig. 4 is a plan view of the refrigerant compressing unit of the invention and is taken on the line 4—4 of Fig. 1.

Fig. 5 is a diagrammatic perspective view illustrating the refrigerating system of the invention.

Figure 3:
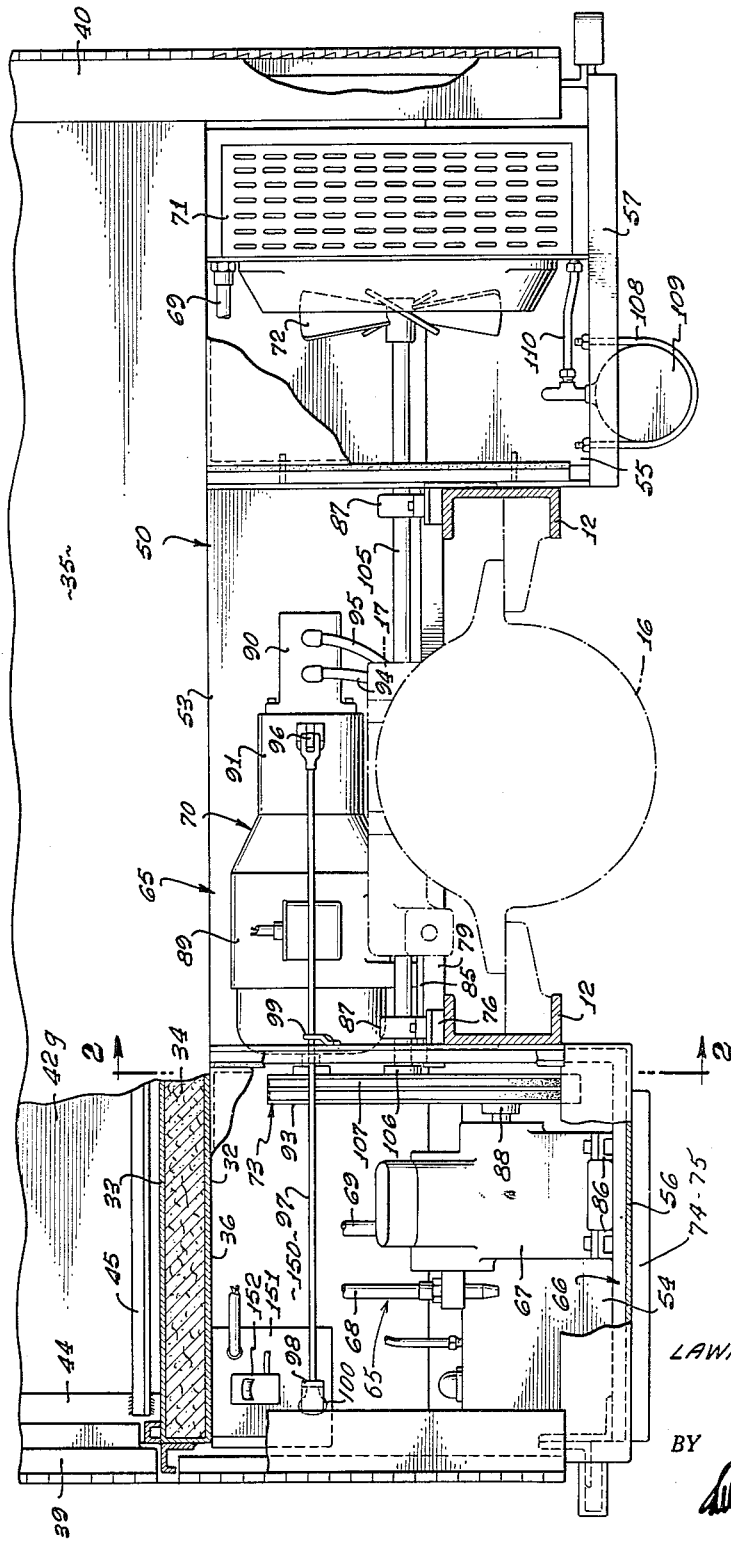
Fig. 3 is an enlarged transverse sectional view taken on the line 3—3 of Fig. 1 and showing the manner in which the various elements of the refrigerant compressing unit of the invention are fitted into the irregular space otherwise wasted and available to receive the same in the front lower corner of the truck body.

Referring specifically to the drawings, the invention is there shown as embodied in a self-refrigerated highway truck 10 having an automotive chassis 11 including a main frame 12 mounted on front wheels 13 and rear drive wheels 14. Mounted on the frame 12 between the front wheels 13 is a truck engine 15 having a transmission housing 16 and a gear shift mechanism 17. The engine 15 is connected in the conventional manner with the rear wheels 14 for driving the same. The truck engine 15 also is provided with a power-take-off oil pump 18, the function of which will be made clear hereinafter.

Pivotally mounted on a shaft 19 on the extreme front end of the main frame 12 is a driver's cabin 20 which is equipped with a jack 21 by which the cabin 20 may be tilted from its normal position (shown by broken lines in Fig. 1) to an elevated position (shown in full lines in Fig. 1) for the purpose of giving access to the engine 15 for inspection, repair, and maintenance purposes.

Mounted on the main frame 12 so as to extend downwardly just below said frame on opposite sides thereof is a rectangular refrigerated body 30. This body comprises a rectangular cold box all the walls of which are formed of spaced sheets of metal 32 and 33, the space between which is filled with heat insulating material 34 (Figs. 2 and 3). The walls of box 30 include a front wall 35 (Fig. 1), a bottom wall 36 (Fig. 2), a rear wall 37, a top wall 38, and side walls 39 and 40 (Fig. 3).

The side walls 39 and 40 are formed by a series of narrow full height doors 41 which are hingedly mounted back to back along adjacent vertical edges to cover closely spaced vertical door openings formed in the side walls 39 and 40. The door openings in side wall 39 are directly opposite corresponding door openings in side wall 40 thereby providing ready access separately to either end of each of a series of transverse compartments 42 into which the interior of cold box 30 is divided by a series of cold plates 43 (Fig. 5) which are supported by vertical bars 44 carrying horizontal angle irons 45 (Fig. 1) which act as supporting rails for cases 46, of uniform size, in which the product is packed for conveniently loading the same into and removing it from the truck 10.

The bottom wall 36 of the refrigerated body 30 varies in height throughout its length to accommodate itself to compartments 42 which differ in height. To distinguish the seven compartments 42 from each other these will be designated by reference characters 42a to 42g inclusive. The doors 41 likewise differ in height to fit their respective compartments 42 and for distinguishing these doors they are identified in the drawings by reference characters 41a to 41g inclusive. The compartments 42a, 42e, and 42f are of maximum height with the bottom wall 36 of the refrigerated body 30 under these compartments resting directly on the main frame 12. The doors 41a, 41e and 41f are thus of maximum length. To accommodate the differential and axle structure on which the rear drive wheels 14 are mounted, the bottom wall 36 is higher, by approximately the height of a single case 46 under the three compartments, 42b, 42c, and 42d, and the doors 41b, 41c, and 41d are correspondingly shorter than the doors adjacent thereto.

Compartment 42g, which is at the front end of the refrigerated body 30, is likewise shortened at its lower end to form a refrigerant compressing unit recess 50 in the front lower corner of the refrigerated body 30. The doors 41g for said compartment are likewise shortened to fit the same. Access to the recess 50, at its opposite ends, is had by side doors 51 and 52.

As clearly shown in Fig. 3 the recess 50 has the main frame 12 of chassis 11 extending horizontally through the middle portion 53 of said recess so that said middle portion is much shallower than the opposite end portions 54 and 55 of said recess. End portion 54 of recess 50 has a bottom wall 56 and end portion 55 of said recess has bottom bars 57. Said recess end portions also have removable front wall sections 58 and 59. The side door 52 is provided with louvers 60 for ventilation purposes.

As clearly shown in Figs. 3 and 4, the transmission housing 16 and gear shift mechanism 17 of the truck engine 15 extend into and partly occupy the middle portion 53 of the recess 50. The front end of this middle portion of said recess is left open although this may, if desired, be normally covered with a removable wall section such as the wall sections 58 and 59. The ease with which the latter sections may be removed renders the recess 50 at all times accessible from the front of the refrigerated body 30 whenever the cabin 20 is rocked upwardly as shown in full lines in Fig. 1.

The recess 50 provides a housing for a refrigerant compressing unit 65 which is mounted therein. This unit includes a frame 66, a refrigerant compressor 67 having suction and discharge tubes 68 and 69, a compound drive motor 70, a refrigerant condenser 71 having a fan 72, and a transmission means 73 through which the compressor 67 and fan 72 are driven by the compound motor 70.

The frame 66 (Figs. 2, 3 and 4) includes channel members 74 and 75, the latter having a plate 76 welded thereon. The member 74 and said plate are secured by bolts 77 to the right channel member of the main chassis frame 12. Welded to upper ends of the channel member 74 and plate 76 are horizontal channel members 78 and 79 on which a motor platform 85 is welded. Lower ends of channel members 74 and 75 are bent to extend horizontally outwardly and are secured to the bottom wall 56 of the right end portion 54 of recess 50 and are secured at their outer ends to the lower edge of the body side wall 39 (Fig. 3). Mounted on the channels of the main chassis frame 12 are self-aligning bearings 87.

The horizontal portions of channels 74 and 75 are joined by cross bars 86. The compressor 67 is bolted to the bars 86, said compressor having a pulley 88 for driving the same.

The compound motor 70 includes an electric motor 89, a fluid motor 90, and a manually operable clutch 91 which integrally unites the motors 89 and 90 in co-axially aligned relation. The compound motor 70 is thus supported by the mounting of the motor 89 on the motor mounting platform 85. The electric motor 89 has a shaft 92 on which is fixed a drive pulley 93, the latter being in radial alignment with the pulley 88.

The fluid motor 90 is provided with pressure and exhaust lines 94 and 95 by which fluid is circulated through said motor in driving the same. The clutch 91 provides a means for optionally co-axially uniting the fluid motor 90 with the shaft 92 of the electric motor 89 or breaking this connection, said clutch having a lever 96 by which it may be manually operated. Attached to the end of lever 96 is a rod 97 which is slideably supported on frame brackets 98 and 99 and terminates in a knob 100 by which the rod 97 may be pushed or pulled to manipulate the lever 96.

Journaled in the bearings 87 is a jack shaft 105, the axis of which lies close to the center of the condenser 71, and the adjacent end of this shaft has the condenser fan 72 fixed thereupon. The opposite end of shaft 105 carries a pulley 106 which is in radial alignment with the pulleys 88 and 93 and is rotationally united with said pulleys by a double V-belt 107 which is trained about said pulleys.

The condenser 71 is mounted on the bottom bars 57 of the left end portion 55 of the housing recess 50. Also supported on said bars by U-bolts 108 is a refrigerant receiving tank 109 which is connected with the lower end of the condenser 71 by a refrigerant tube 110. The pressure discharge tube 69 of the refrigerant compressor 67 connects with the upper end of the condenser 71.

The intake side of compressor 67 is connected by tube 68 and branch tubes 111 and 112 with the upper edges of cold plates 43 which are identified as cold plates A and C, of a series A, B, C, D, and E of said cold plates which are embodied in the structure of the cold box 30. The lower edge of cold plate A is connected by a tube 113 with the upper edge of cold plate B while the lower edge of cold plate C is connected by a tube 114 with the upper edge of cold plate E. The lower edge of cold plate E is connected by a tube 115 with the upper edge of cold plate D. Cold plates B and D are equipped with thermostatic elements 116 and 117 respectively which are connected to and actuate control valves 118 and 119.

The opposite end of the receiving tank 109 is connected by a tube 129 with a dryer 130 which is connected by a tube 131 to a sight glass 132, the latter being connected by a tube 133 having branches 134 and 135 to the valves 118 and 119.

When the temperature in the cold box 30 is above the given minimum, the thermostatic elements 116 and 117 cause the valves 118 and 119 to be open to allow refrigerant delivered thereto through tubes 134 and 135 to flow from said valves through tubes 136 and 137, respectively, and to the lower ends of cold plates B and D.

Tubes 68 and 133 travel parallel to each other through a heat exchanger 138 to cool refrigerant entering the plates 43 by the refrigerant being withdrawn therefrom.

Secured to a vertical portion 150 of the cold box bottom wall 36 forming the recess 50 is an electric outlet box 151 having mounted thereon a thermo-responsive electric switch 152 which is connected to a thermostatic element 153 mounted in the dead air space between the two rearmost cargo compartments 42 of the cold box 30. This switch includes relays (not shown) for turning on and shutting off the supply of electricity to the electric motor 89 in accordance with the temperature indicated in the cold box 30 by the thermostatic element 153. The outlet box 151 has a receptacle 157 into which a plug 158 of a service cord 159 may be inserted for the purpose of energizing the electric supply system of the electric motor 89.

Oil pump 18 (Fig. 5) has an oil suction line 170 which draws oil from an oil supply reservoir 171 and a discharge line 172 which is connected by a pressure regulating valve 173 to lines 94 and 95 of the oil motor 90. The line 94 is a pressure line through which oil is delivered under pressure to the motor 90 and the line 95 returns oil from the motor 90 to the oil reservoir 171. Line 95 also returns to the oil reservoir, oil escaping from the valve 173 when the pressure builds up in line 94 above a predetermined value.

As clearly shown in Figs. 3, 4, and 5, the knob 100 for controlling the clutch 91 and the outlet box 151, having the receptacle 157 for receiving a plug 158 to energize the electric motor 89 are readily accessible at the right end of recess 50 upon opening the door 51.

*Operation*

Where the refrigerated truck 10 is employed in the wholesale delivery of fresh dairy products packed in the cases 46, and upon returning from its daily route it is placed in storage in a garage until the start of the next day's run, it has been found economical to keep the cargo space within the cold box 30 constantly within a given range of refrigerating temperatures such as between 29° F. and 40° F., for twenty-four hours a day. This is accomplished while the truck is out on its delivery route by running the truck engine 15 most of the time at a sufficient speed that the oil delivered from oil pump 18 will rotate the oil motor 90 and cause this to drive the refrigerant compressing unit 65 to accomplish the desired refrigeration.

If, owing to the truck 10 being driven for long periods at a high rate of speed, the temperature within the cold box 30 is lowered to the prescribed minimum, and there is a tendency for this temperature to be still further lowered by virtue of the rate at which the refrigerant compressing unit 65 is being driven by the oil motor 90, the thermostatic elements 116 and 117 will actuate the control valves 118 and 119 so as to restrict the flow of refrigerant through these valves to the cold plates 43. This restriction will be to a degree which will prevent the temperature in the cold box 30 being lowered substantially below said minimum.

When the delivery route on which the truck 10 is being used is completed and the truck is returned to its garage or yard for overnight storage, the truck is parked close to an electric outlet having a service cord 159. The oil motor 90 is then disconnected from the drive shaft 92 of the unit 65 by pulling on knob 100, and the plug 158 of said service cord is inserted into the receptacle 157 thereby starting motor 89 which continues the operation of the refrigerant compressing unit 65 throughout the period that the truck 10 is halted in storage.

The regulation of the temperature produced by the unit 65 in the cold box 30, when this unit is being driven by electric motor 89, is taken care of by the switch 152 which breaks the circuit of the electric motor 89 when the temperature in the box starts to drop below said minimum and starts the motor 89 again when the box temperature has risen a certain number of degrees above said minimum temperature. This action of the switch 152 is in response to the thermostatic element 153 which is located in said box.

Figs. 1 and 2 illustrate the fact that the space devoted to the recess 50 and which serves as a housing for the refrigerant compressing unit 65 is not available to be used as a portion of the cargo space of the cold box 30 because of the obstruction of the central portion of this space by the main frame 12 and the transmission housing 16 and gear shift mechanism 17 of the truck engine 15. One of the great advantages of the present invention is that this otherwise unused space in the refrigerated body 30 is utilized to house a refrigerating unit with the latter entirely confined within the general rectangular outline of said body.

This result is accomplished by placing the taller of the elements of the refrigerant compressing unit, to wit: the compressor 67 and the condenser 61 in the deeper end portions of the recess 50, and providing a relatively compact motor for driving this unit and mounting said motor in the relatively shallow central portion of the recess 50. Another advantage of substantial merit is the provision of a compound drive motor including an electric motor for night operation and a hydraulic motor for day operation which compound motor is relatively low in height and thus fits into the shallow central portion of the recess 50.

The high degree of accessibility afforded the refrigerant compressing unit in the present invention also represents an important advantage. Where the invention is embodied with a truck of the particular type illustrated in Fig. 1, complete access can be had to the front open face of the recess 50 when the cabin 20 is tilted upwardly as shown in full lines in this view. The removable wall panels 58 and 59 cover the deep end portions 54 and 55 of the recess 50 but these can be quickly removed when the cab 20 has been raised so as to expose the entire recess 50 to access from the front.

The claims are:

1. In a self-refrigerated highway truck, the combination of: a running chassis having a main frame; a truck engine mounted on the front end of said frame for propelling said chassis; a driver's cabin mounted on said frame to overlie said truck engine and shiftable upwardly to render said engine accessible; a refrigerated body mounted on said frame to the rear of and close to said cabin when the latter is in its normal operating position, said body being substantially rectangular in form and having an externally open transverse recess formed within the front lower corner portion of the body, said recess being separated by walls of insulation from the cargo space within said body; a series of cold plates mounted in said cargo space for cooling cargo carried in said space; a refrigerant compressing unit housed within said recess, said unit including a refrigerant compressor which is located in one end portion of said recess, which portion extends a substantial distance below the main frame of said chassis, and a refrigerant condenser equipped with a rotary fan which are similarly located in the opposite end portion of said recess, and a compound motor including an electric motor, a clutch, and a fluid motor, said compound motor being mounted in a portion of said recess located above said main chassis frame, and transmission means connecting said compound motor with said compressor and said condenser fan whereby said compressor and condenser fan may be optionally operated by said electric motor or by said fluid motor; a fluid pump mounted to be driven by said engine; and means connecting said pump with said fluid motor whereby said unit will be driven by said engine when said truck is travelling on the highway, said recess opening forwardly from said body whereby said recess is covered by said cabin, when the latter is lowered, and rendered open for access to said compressing unit when said cabin is lifted to render said engine accessible.

2. A combination as in claim 1 in which said electric motor is mounted on said main chassis frame with its axis disposed transversely thereof and in which said clutch is mounted co-axially with and supported upon one end of said electric motor, and in which said fluid motor is mounted co-axially with and supported on the outer end of said clutch whereby the mounting of said electric motor supports the entire compound motor.

3. In a self-refrigerated highway truck, the combination of: a running chassis having a main frame, a truck engine mounted on the front end of said frame for propelling said chassis; a driver's cabin mounted on said frame over said truck engine; a refrigerated body mounted on said frame to the rear of and close to said cabin, said body being substantially rectangular in form and having an externally open transverse recess formed within the front lower corner portion of the body, said recess being separated by walls of insulation from the cargo space within said body and having an inverted U-shape so that the central portion of said recess which overlies said main frame is substantially shallower in depth than the lateral end portions of said recess; a refrigerant compressing unit housed within said recess, said unit including a refrigerant compressor which is located in one of the lateral deeper end portions of said recess and a refrigerant condenser equipped with a rotary fan which are similarly located in the opposite lateral deeper end portion of said recess; a compound motor including an electric motor, a clutch, and a fluid motor with the clutch disposed co-axially with and mounted on and supported by one end of said motor and with said fluid motor disposed co-axially with and mounted on and supported by the other end of said clutch, said compound motor being mounted in the relatively shallow middle portion of said recess with its axis disposed transversely of said truck body; and transmission means connecting said compound motor with said compressor and said condenser fan whereby said compressor and condenser fan may be optionally operated either by said electric motor or by said fluid motor.

References Cited in the file of this patent

UNITED STATES PATENTS

| | | |
|---|---|---|
| 1,943,317 | Hulse | Jan. 16, 1934 |
| 2,376,491 | Kinney | May 22, 1945 |
| 2,467,398 | Miller | Apr. 19, 1949 |
| 2,530,241 | Harrington | Nov. 14, 1950 |
| 2,667,761 | Sellstrom | Feb. 2, 1954 |